United States Patent [19]

Shoemaker, Jr. et al.

[11] Patent Number: 5,027,955
[45] Date of Patent: Jul. 2, 1991

[54] STORAGE RACK FOR DISCS, CASSETTES AND THE LIKE

[76] Inventors: Stephen P. Shoemaker, Jr., 123 International Boardwalk, Redondo Beach, Calif. 90277; Eric L. Brashear, 1663 Industrial Ave., Unit H, Norco, Calif. 91760

[21] Appl. No.: 452,711

[22] Filed: Dec. 19, 1989

[51] Int. Cl.⁵ .............................................. A47G 29/00
[52] U.S. Cl. ..................................... 211/40; 206/309; 206/444; 211/41
[58] Field of Search .................. 211/40, 41; 206/444, 206/309, 45.14, 45.18

[56] References Cited

U.S. PATENT DOCUMENTS

| | | | |
|---|---|---|---|
| 632,876 | 9/1899 | Meaker, Jr. | 211/41 |
| 1,251,456 | 12/1917 | Ives | 211/41 |
| 2,634,865 | 4/1953 | Geheb | 211/41 |
| 4,358,018 | 11/1982 | Wolfe | 211/41 |
| 4,629,067 | 12/1986 | Pavlik et al. | 211/41 X |

FOREIGN PATENT DOCUMENTS

| | | | |
|---|---|---|---|
| 353388 | 9/1905 | France | 211/41 |
| 8603327 | 6/1986 | PCT Int'l Appl. | 206/444 |
| 263224 | 11/1949 | Switzerland | 211/41 |

Primary Examiner—David L. Talbott
Attorney, Agent, or Firm—Brown, Martin Haller & McClain

[57] ABSTRACT

A storage rack for relatively thin, flat articles such as audio or video cassettes, compact discs, or computer discs comprises a shelf unit having a rear wall and a plurality of spaced parallel shelf flanges projecting outwardly from the rear wall, and a support for supporting the shelf unit in a generally upright orientation with its rear wall inclined rearwardly. Each adjacent pair of shelf flanges is arranged to slidably receive the rear edge portion only of an article and to support the article in a generally horizontal orientation with its outermost edge located in a staggered relationship relative to the next adjacent articles.

20 Claims, 2 Drawing Sheets

STORAGE RACK FOR DISCS, CASSETTES AND THE LIKE

BACKGROUND OF THE INVENTION

The present invention relates generally to a storage rack for storing flat, relatively thin rectangular or regular shaped articles such as compact discs, computer discs, video cassettes, audio cassettes and the like in a visible and accessible fashion.

Compact and easily accessible storage facilities for cases containing various types of recorded media, such as compact discs, audio or video cassettes, and computer discs are desirable both to facilitate tidy organization of such material and also to reduce the risk of damage or loss. Various storage racks of this nature have been proposed in the past, for example of the open top, wooden box type with internal dividers for separating adjacent cases. These typically take up a relatively large amount of space for their storage capacity. Also, such storage racks are often relatively expensive.

SUMMARY OF THE INVENTION

It is an object of the present invention to provide an improved storage rack for compact discs, computer discs, video cassettes, audio cassettes and like articles.

According to the present invention, a storage rack for articles such as compact discs, computer discs, video cassettes, audio cassettes and the like comprises a shelving unit comprising a rear wall and a plurality of spaced, parallel shelf flanges projecting outwardly from the rear wall to define a shelf between each adjacent pair of flanges. The rack includes a support assembly which supports the shelf unit in a generally upright orientation with the rear wall inclined rearwardly. The spacing and dimensions of the flanges are predetermined according to the specific articles to be stored between each adjacent pair of flanges. Each adjacent pair of flanges is shaped and dimensioned for slidably receiving the rearmost edge portions of an article to be stored so that the majority of the article projects outwardly from the rack, and includes shaped surface portions for supporting the article in a generally horizontal orientation with its outermost edge located in a staggered relationship relative to the next adjacent stored articles.

Preferably, each flange has an upturned outer lip portion forming a seat for a bottom surface portion of a stored article adjacent its innermost or rearmost edge as stored, and for supporting the article in a horizontal orientation and reducing the risk of the article slipping out of the rack. The upturned outer edges of the flanges also make it easier to remove and re-insert articles when the rack is full. In addition, the lower surface of each flange preferably has shaped formations for seating against the upper surface of the stored article adjacent its rearmost edge to provide additional support.

The storage rack may be designed to store only one type of article, for example compact discs or video cassettes, or the same rack may include shelves dimensioned for storing different types of article. For example, a single rack may have several shelf levels for storing compact discs, several levels for video cassettes, and one or more levels for audio cassettes.

Preferably, the shelf unit is extruded as a continuous strip from a suitable plastic or metal material, and the extruded strip can then be cut to the desired lengths according to the desired range of storage capacities. This makes an inexpensive, easy to manufacture unit.

The length of the shelf unit will be approximately equal to a suitable multiple of the width of the article to be stored. For example, it may be designed to store one or more vertical columns of articles, according to the selected length dimensions.

The storage rack has an appearance similar to bleachers as used for audience seating at sporting and other events. Since the outer edges of the stored articles are staggered inwardly progressively from the bottom to the top of the rack, access to a particular article in the stack will be relatively easy without disturbing the adjacent articles. When the rack is substantially full, a removed article can also be replaced relatively easily without disturbing the stack.

The width or projection of each shelf flange from the rear wall of the unit is relatively short as compared to the corresponding dimension of the article to be stored, so that a substantial portion of the article projects outwardly from the rack, also making it more easily accessible and improving the overall appearance of the rack when full, since the rack itself will be substantially hidden by the stack of articles.

Preferably, the support assembly allows the rack to be stood on a table or other support surface or alternatively to be hung on a wall. The support assembly may be removable to allow the storage rack to be placed with its rear wall flat on a table or support surface in another storage configuration in which the articles are stored vertically rather than horizontally. The user can then select the appropriate storage configuration according to their preference.

Although the rack is particularly intended for storing compact discs, video cassettes, audio cassettes or computer discs, it may alternatively be designed for storing any relatively thin, rectangular or square rigid articles which must be stored in quantity, for example books, packages of food or other items, and so on.

The rack is compact, easy to use, and relatively inexpensive, and provides convenient storage space for any article of a flat, regular nature which must be stored in quantity.

BRIEF DESCRIPTION OF THE DRAWINGS

The present invention will be better understood from the following detailed description of some preferred embodiments taken in conjunction with the accompanying drawings, in which like reference numerals refer to like parts, and in which.

DESCRIPTION OF THE PREFERRED EMBODIMENT(S)

Figure 1:
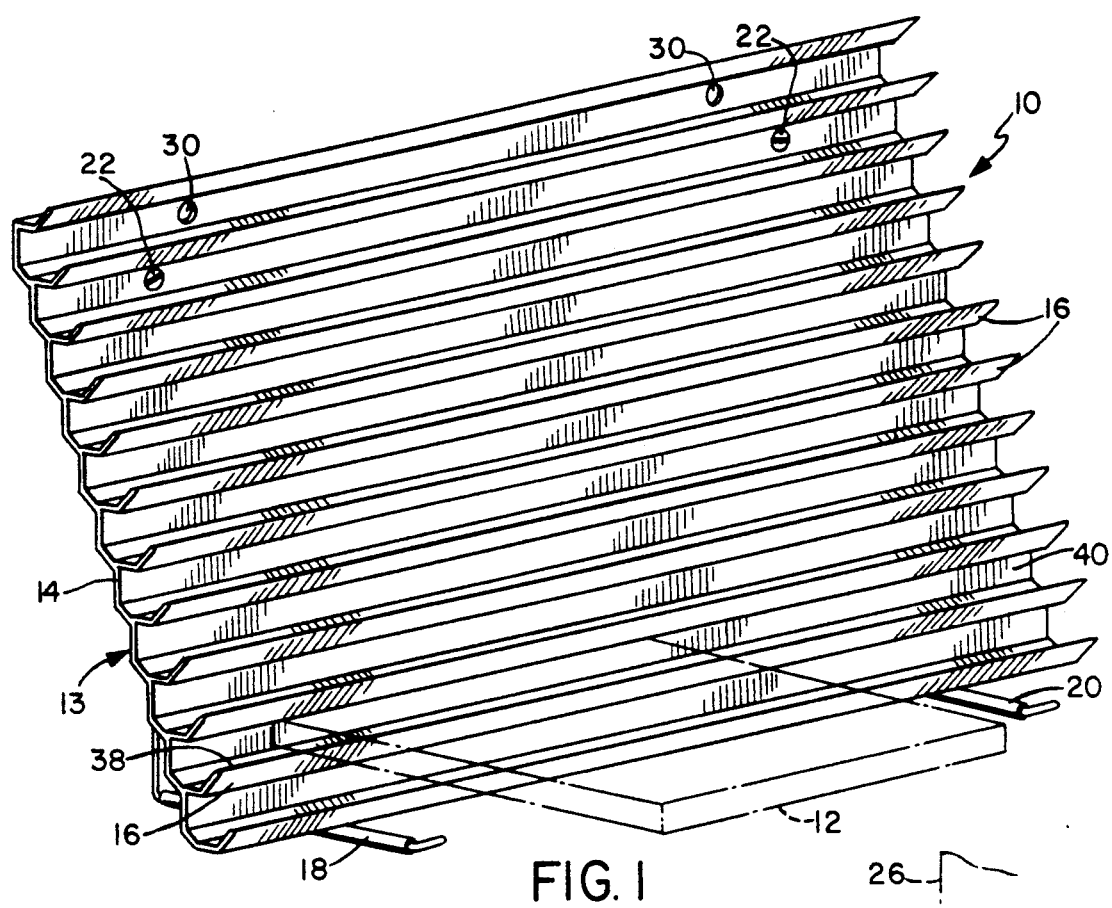
FIG. 1 is a perspective view of the basic form of the storage rack according to a first embodiment of the invention.
Figure 2:
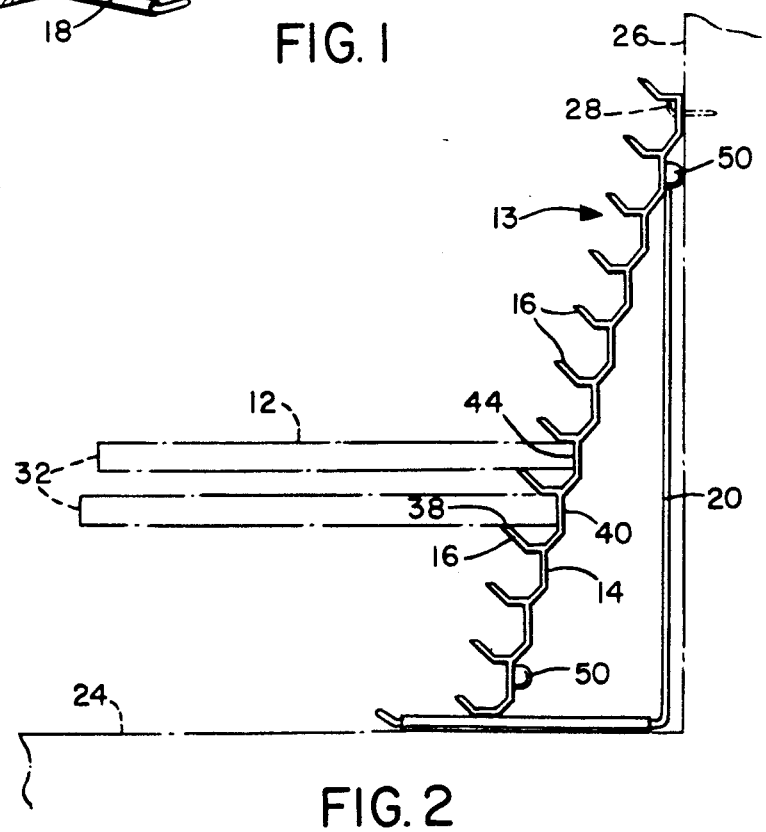
FIG. 2 is an end view of the rack.
Figure 3:
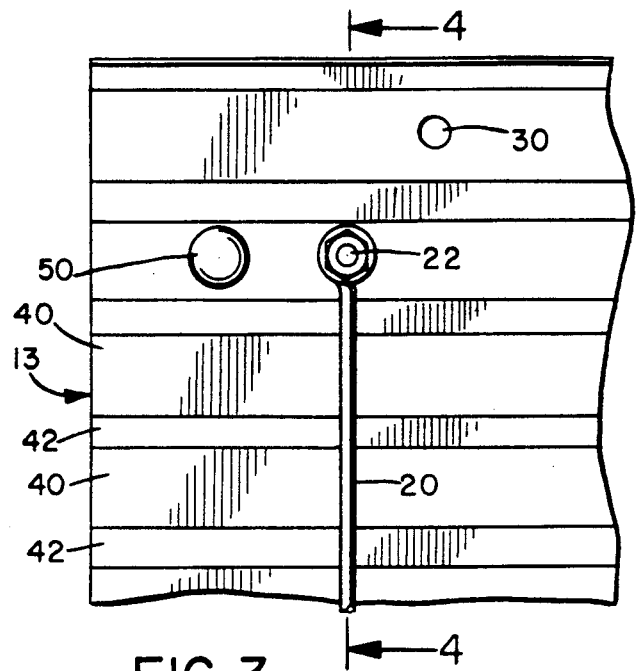
FIG. 3 is an enlarged rear view of a portion of the rack.
Figure 5:
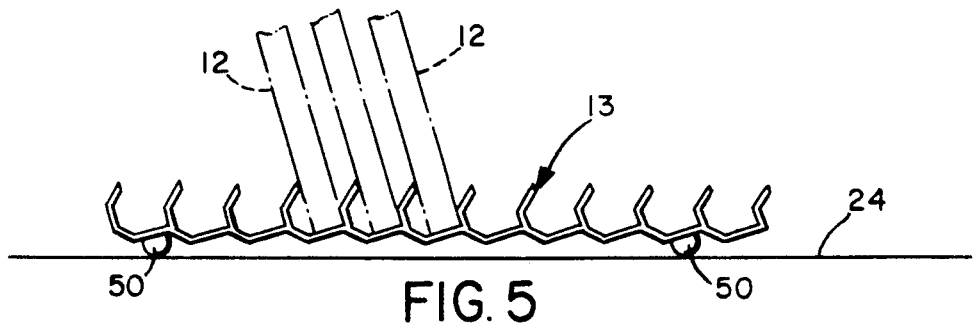
FIG. 5 is an end view of the rack mounted flat on a horizontal surface.

FIGS. 1 to 5 of the drawings illustrate a first embodiment of a storage rack or support stand 10 for flat rectangular or regular shaped articles such as compact discs, videocassettes and the like. The rack illustrated in FIGS. 1 to 3 is dimensioned for supporting compact discs 12. However, it will be understood that the shelf length and spacing can be modified for supporting other similar articles which are generally stored in relatively large numbers, such as computer discs, audio cassettes and video cassettes.

The rack comprises a shelf unit 13 having a rear wall 14 and a plurality of spaced, parallel shelf flanges 16 projecting outwardly from the rear wall 14. Removable L-shaped support legs 18, 20 are releasably secured to the back of wall 14 by releasable fasteners such as screws 22 so as to support the rack in generally upright orientation with its rear wall inclined or tilted rearwardly, as illustrated in FIGS. 1 and 2. In this orientation, the rack can stand on a table or other flat surface 24, or may alternatively be hung on a wall 26 via suitable hangers or hooks 28 extending through openings 30 provided for this purpose adjacent the upper edge of the rear wall 14. The angle of tilt of the rear wall to the horizontal is preferably of the order of 70 to 75 degrees.

The shelf flanges 16 are designed to form shelves to slidably receive the rearmost edge portion of an article to be stored, such as compact discs 12 as illustrated in FIG. 2, and to support each disc 12 in a generally horizontal orientation with its outermost edge 32 in a staggered relationship relative to the next adjacent discs. The width of the shelf flanges is substantially less than the corresponding width dimension of the article to be stored, for example of the order approximately 1/10 of the article width. The staggered presentation makes the titles of the discs, which are printed on the outer edges 32, more visible, and this in combination with the relatively short shelf retention length also makes it easier to insert discs into the rack or remove them when needed.

Figure 4:
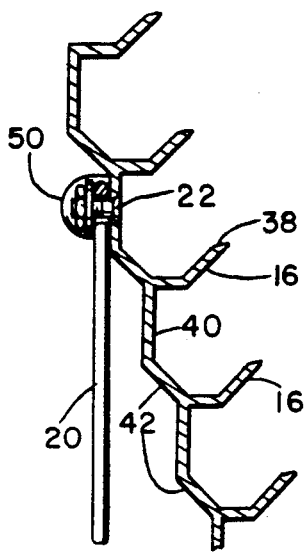
FIG. 4 is a sectional view taken on line 4—4 of FIG. 3.

As best illustrated in FIG. 4, each flange 16 has an upper surface which forms the lower wall of one shelf and a lower surface which forms the upper wall of the next adjacent shelf. Each flange includes a first, inner portion which extends horizontally outwardly from the rear wall when oriented as in FIGS. 1, 2 and 4, and an outer, upwardly tilted portion which has an upwardly directed, flattened seating face 38 at its outer end for seating against the lower surface of a disc 12 in that shelf for supporting it horizontally. This support is best illustrated in FIG. 2. At the same time, the rear wall is of a generally "zig-zag" or indented configuration so that the rear wall portion of each individual shelf between adjacent shelf flanges 16 is recessed and includes a substantially vertical upper part 40 of thickness substantially equal to the thickness of the article to be stored, and an outwardly or forwardly inclined lower part 42. The upper part 40 of each individual shelf rear wall is designed to locate the rearmost edge 44 of a disc or article stored in that shelf, as illustrated in FIG. 2, and the locating parts 40 of successive shelves are staggered progressively outwardly or forwardly in the upright orientation from the top to the bottom of the unit 13 by means of the connecting, inclined lower parts 42, ensuring that the outer edges of the stored articles are similarly staggered. Further support for each stored article is provided by the flat or horizontal portion of the undersurface of each flange, which bears against the upper surface of the article 12 adjacent its rear edge to locate it in a horizontal orientation and resist tipping of the article out of the shelf (See FIG. 2). It will be understood that similar support could alternatively be obtained, for example, by downwardly projecting ribs on the uppermost flange of each individual shelf. However, the configuration of FIGS. 2 and 4 provides a generally square-shaped corner or keying recess at the rear end of each shelf which positively locates the rear edge of each article as well as an adjacent portion of the upper surface, for increased stability.

As best seen in FIG. 2, each stored article is supported at three places by means of the upper part 40 of each shelf rear wall which locates the rear edge of the article, the adjacent flat lower surface portion of the overlying shelf flange, and the upwardly inclined end portions of the underlying shelf flange. The upwardly inclined end portions of each flange also provide an enlarged or more accessible opening at the outer end of each shelf, allowing articles to be inserted more easily. It can be seen particularly from the view in FIG. 2 that the appearance of the rack is similar to that of "bleachers" as used for seating people at sporting and other events.

The shelf unit 13 is preferably extruded as a strip of suitable metallic or plastics material, using an extrusion head of the desired shape corresponding to the cross-section of shelf unit 13 (see FIG. 2). The thickness of the extruded material will be dependent on the particular material used and will be sufficient to provide the desired rigidity. For a rack of extruded aluminum, for example, the material thickness may be of the order of 0.075 to 0.08 inches. The extrusion is then cut to the desired length dependent on the type of article and the storage capacity desired. This results in a simple and inexpensive construction.

As noted above, the dimensions of the shelf unit are selected according to the dimensions of the article to be stored and the desired storage capacity. In the case of a compact disc, which has standard case dimensions of 4.9 by 5.6 by 0.4 inches, the thickness or height of the upper portion of each shelf rear wall in one specific example was of the order of 0.4 inches or slightly greater. The width of each shelf from the rear wall to its outer end was of the order of 0.4 to 0.5 inches. The length of the unit is dependent on how many side by side vertical columns or rows of discs are to be stored, with the length being 5.5 inches for a single column of discs, 11 inches for two columns, 17 inches for three columns, and so on. In the example illustrated, the rack has 11 shelves. However, a greater or lesser number of shelves may be provided according to the desired storage capacity, for example between 7 and 15 shelves. The maximum possible number of shelves will depend on the particular article or articles being stored, since the articles will become unstable if stacked too high. Typically, a greater number of shelves can be used for thinner articles than for thicker articles. In practice, the optimum number of shelves for a storage rack for compact discs only will be of the order of ten to twelve.

In the embodiment illustrated in FIGS. 1 to 3, the angle of tilt of the rear wall will be selected in order to ensure that the upper portion of the rear of each shelf is substantially vertical. In one particular example, the angle of tilt to the horizontal was between 70 and 75 degrees. The outer end portion of each flange was tilted at a 45 degree angle to the inner, horizontal portion, resulting in an upward tilt of approximately 30 degrees if the rear wall was supported vertically, and the lower portion of the rear of each shelf was also inclined at 45 degrees to portion 36.

The storage rack of FIGS. 1 to 3 may be stored or positioned in any of three possible ways. As illustrated in FIGS. 1 and 2, the rack can be stood upright on a table or other flat surface, or hung from a wall using suitable wall hooks engaging in openings 30 provided in the rear wall itself, or alternatively suitable hanger loops may be provided at the upper end of each leg member. In another alternative arrangement illustrated in FIG. 5, the leg members are removed and the rack is placed flat on a suitable surface to store articles upright rather than horizontally. As illustrated, suitable feet or small pads 50 are provided on the rear surface of wall for supporting the rack in the orientation illustrated in FIG. 5.

Figure 6:
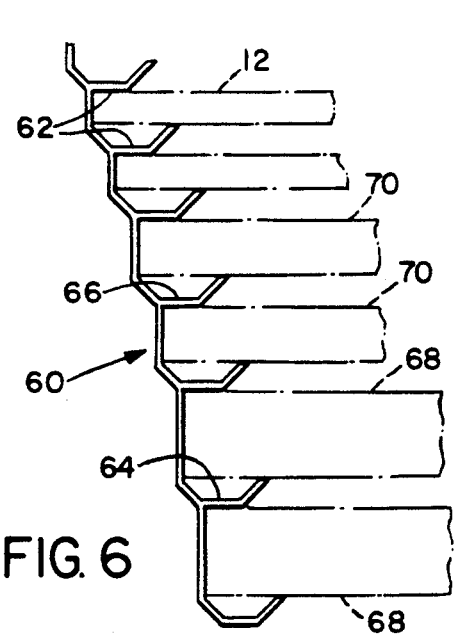
FIG. 6 is an end view of a multiple rack for different sizes of cassettes.

Although in the embodiment illustrated in FIGS. 1 to 5 the rack is designed for storage of a plurality of identical articles, for example compact discs or any other flat, regular shaped article such as video cassettes, audio cassettes, computer discs, books and the like, a storage rack may also be designed to provide storage space for different types of article, for example for storing the various materials used in a home entertainment center. FIG. 6 illustrates a rack 60 having storage shelves 62,64 and 66 of different dimensions designed for locating compact discs 12, video cassettes 68, and audio cassettes 70, respectively.

Each individual shelf is of similar shape to the identical shelves of the first embodiment, but with modified dimensions to accommodate the dimensions of the particular article to be stored in that shelf. For example, the vertical upper end portion of the rear wall of each shelf will have a height or thickness substantially equal to the thickness of the article to be stored in that shelf, so that the respective upper portions of the rear wall of shelves 62 will be thinner than those of shelves 66, while shelves 64 for locating video cassettes will have the thickest upper rear wall portions. Each item to be stored is arranged with the edge carrying the title facing outwardly and the rearmost edge located against the flat upper portion of the rear wall of the shelf, as illustrated in FIG. 2 in connection with the first embodiment of the invention. As in the first embodiment, the length of the storage rack will be a selected multiple of the longest item to be stored. A rack length of 17 inches, for example, will provide storage space for three side by side columns of vertically stacked compact discs, two columns of video cassettes, and four columns of audio cassettes. In one specific example, a rack was designed with two levels or shelves for compact discs, four levels or shelves of video cassettes, and one shelf of audio cassettes. If such a rack was made in 17 inch lengths, each unit would have storage capacity for 6 compact discs, 8 video cassettes, and 4 audio cassettes. A rack can be built with any desired size of storage area for any combination of articles to be stored, by suitably adjusting the number, length, and dimensions of the shelves.

The rack itself is lightweight, utilizes a relatively small amount of material as compared to the storage capacity provided, and takes up little space when not in use. It is inexpensive and relatively easy to manufacture, and provides a versatile and easy to use storage facility for various types of articles which are typically kept in relatively large numbers. Typically articles such as videocassettes, compact discs, computer discs and the like are kept in relatively large numbers, making some storage and organization more or less essential to reduce the risk of damage or loss, avoid the untidy appearance of large numbers of such articles lying around haphazardly, and make the articles readily accessible and their titles or subject matter easily visible.

Figure 7:
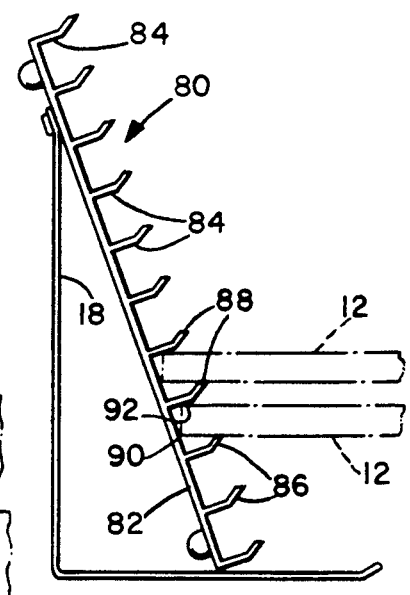
FIG. 7 is an end view of an alternative configuration of the basic rack.

FIG. 7 illustrates a modified storage rack 80 which is similar to the embodiment of FIGS. 1 to 5 but has a modified shelf design. The support legs in this embodiment are identical to those of the first embodiment, and like reference numerals have been used where appropriate. Also as in the first embodiment, the rack can be used in the upright, tilted orientation of FIGS. 1 to 4 as well as a horizontal or flat orientation similar to that illustrated in FIG. 5 in connection with the first embodiment.

In the embodiment of FIG. 7, the rear wall 82 of the unit is flat, while each shelf flange 84 has a rear portion which projects substantially perpendicular to rear wall 82 and an upwardly tilted outer end portion which has a seating surface 88 at its outer end for seating against a lower surface portion of an article such as compact disc 12 stored in the overlying shelf area. Each article 12 is inserted into the gap between adjacent flanges 84 in a generally horizontal orientation until its rear and lowermost edge 90 contacts the rear wall of the respective shelf. The upper edge 92 will rest against the flat portion of the overlying flange, while the undersurface is seated on the seating surface 88 of the underlying flange. This three point support will tend to support the articles in a relatively stable, horizontal stack with their outermost edges staggered progressively inwardly from the bottom to the top of the stack, as in the first embodiment. However, the design is inherently less stable than the first version where the entire rear end edges and part of the adjacent upper surface of the articles are positively located in a correspondingly square or corner shaped keying recess at the rear of the respective shelf. Thus, the first embodiment of the invention is more suitable for improved stability, particularly where the articles are relatively heavy. However, the stability of the embodiment illustrated in FIG. 7 may also be improved by the provision of downwardly projecting ribs or protrusions in the upper wall or flange of each shelf, for bearing against the upper surface of the article 12 and resisting tipping.

In one specific example of a shelf or storage rack as illustrated in FIG. 7, the separation between each adjacent pair of flanges was slightly more than the thickness of the item to be stored. For example, in the case of a compact disc of thickness 0.4 inches, the flange spacing was of the order of 0.5 inches, to provide space for the discs to be supported as illustrated. The tilted end portions of the flanges were at an angle of approximately 30 degrees to the rear or inner end portions, and the length of each flange was of the order of 0.4 to 0.5 inches.

The storage rack or support stand described above is compact, easy to use, and inexpensive to manufacture. It can be used to hold any flat, relatively thin article which must be stored in quantity, with suitable modification of the individual shelf dimensions to accommodate the dimensions of the article or articles to be stored. A single unit may be designed to store a plurality of identical articles, or several different types of articles of a common nature, such as compact discs, video cassettes, audio cassettes, and so on. This makes organization and display of such articles easy and convenient, while the articles themselves are easily visible and accessible. The stand itself is versatile, and can be wall hung, or seated on a table either in an upright or flat orientation according to the preference of the user. Several such stands may be conveniently arranged in a display over or adjacent to a home entertainment center, for example, with several standing side by side on a suitable support surface or table, and others hung above them on the wall to provide an attractive and convenient display with minimal space requirements.

Although some preferred embodiments of the invention have been described above by way of example only, it will be understood by those skilled in the field that modifications may be made to the disclosed embodiments without departing from the scope of the invention, which is defined by the appended claims.

We claim:

1. A storage rack for flat, rectangular articles such as compact discs, computer discs, videocassettes or audio cassettes comprising:

a shelf unit of extruded material having a rear wall and a plurality of spaced, parallel shelf flanges projecting outwardly from a front face of the rear wall to a predetermined width substantially less than the corresponding width dimension of an article when stored in the unit;

support feet projecting from the rear face of the rear wall for selectively supporting the rear wall in a horizontal orientation on a horizontal support surface;

support means removably mounted on said rear wall for selectively supporting said shelf unit in a generally upright orientation with its rear wall inclined rearwardly;

hanger means on said rear wall for selectively hanging said rack on a vertical wall with said rear wall inclined outwardly from said wall; and each adjacent pair of shelf flanges comprising shelf means for slidably receiving the rearmost edge portion of an article to be stored, and supporting means for supporting said article in a horizontal orientation when said shelf unit is upright with the outermost edge of each article located in a staggered relationship relative to the next adjacent articles.

2. The rack as claimed in claim 1, wherein the shelf unit has a length equal to at least one article width.

3. The rack as claimed in claim 1, wherein the outer ends of said flanges are tilted upwardly and each outer flange end comprises means for seating against a lower surface portion of a stored article.

4. The rack as claimed in claim 1, wherein the lower surface of each flange includes shaped formations for bearing against the upper surface of an object stored between that surface and the next adjacent flange to support said object.

5. The rack as claimed in claim 1, wherein each flange includes a first, inner portion extending substantially perpendicular to said rear wall and a second, outer portion inclined upwardly from said inner portion.

6. The rack as claimed in claim 5, wherein said second portion is inclined upwardly at an angle between 25 and 45 degrees to said first portion.

7. The rack as claimed in claim 5, wherein said second portion has a flattened upper edge portion for seating an undersurface portion of an article.

8. The rack as claimed in claim 1, wherein said rear wall is tilted at an angle of between 70 to 75 degrees to the horizontal.

9. The rack as claimed in claim 1, wherein said rear wall is flat.

10. The rack as claimed in claim 1, wherein each shelf means has a rear wall comprising a V-shaped indent between each adjacent pair of flanges, the upper part of each indent being substantially vertical and comprising means for locating the rearmost, flat edge of an article to be stored.

11. The rack as claimed in claim 10, wherein the height of the upper part of each shelf rear wall is substantially equal to the thickness of the article to be stored in that shelf.

12. The rack as claimed in claim 11, wherein the shelf unit has a length sufficient to accommodate a plurality of vertically stacked columns of articles.

13. The rack as claimed in claim 1, wherein said shelf unit includes shelf means for storing different types of articles.

14. The rack as claimed in claim 1, wherein the spacing between each adjacent pair of flanges is predetermined according to the type of article to be stored between said flanges.

15. The rack as claimed in claim 14, including pairs of flanges having different spacings for accommodating 18 different types of articles.

16. The rack as claimed in claim 15, wherein the shelf unit has a plurality of shelf means for storing compact discs, a plurality of shelf means for storing video cassettes, and a plurality of shelf means for storing audio cassettes.

17. A storage rack for flat, rectangular articles such as compact discs, computer discs, videocassettes, or audio cassettes, comprising:

a shelf unit having a rear wall and a plurality of spaced, parallel shelf flanges projecting outwardly from said rear wall to a predetermined width substantially less than the corresponding width dimension of an article when stored in the unit to define an article receiving recess between each adjacent pair of shelf flanges;

support means for supporting said shelf unit in a generally upright, rearwardly inclined orientation, said support means comprising at least one generally L-shaped support member, one leg of said support member extending horizontally under the lower end of said shelf unit and the other leg of said support member extending vertically to support a rear portion of said rear wall with said shelf unit inclined at a predetermined angle to the horizontal; and each article receiving recess including upper, lower, and inner wall portions for engaging the opposite upper and lower faces and the innermost edge of an article inserted between the flanges;

said upper and lower wall portions extending generally perpendicular to said inner wall portion of said recess, and said inner wall portion being orientated to extend vertically when said shelf unit is inclined at said predetermined angle;

said upper, lower and inner wall portions of each recess comprising means for supporting said article in a horizontal orientation with its outermost edge located in a staggered relationship relative to the next adjacent article.

18. The rack as claimed in claim 17, wherein said support members are removably mounted on said shelf unit for allowing said shelf unit to be supported with its rear wall horizontal.

19. The rack as claimed in claim 18, wherein said rear wall includes foot means for supporting said rear wall horizontally on a flat support surface.

20. The rack as claimed in claim 17, wherein said upper wall portion comprises a generally flat, horizontal inner surface of each shelf flange for bearing against an upper surface portion of a horizontally supported article, and said lower wall portion comprises a generally flat, horizontal outer end portion of each shelf flange spaced upwardly and outwardly from the inner surface portion of said flange for bearing against a lower surface portion of said article at a location spaced outwardly from said upper surface portion.

* * * * *